J. K. CLARK.
Mop-Head.

No. 166,850.

Patented Aug. 17, 1875.

Witnesses:
Ernst Bilhuber
Henry Gentner

Inventor:
John K. Clark
per
Van Santvoord & Hauff
attys

UNITED STATES PATENT OFFICE.

JOHN K. CLARK, OF BUFFALO, NEW YORK.

IMPROVEMENT IN MOP-HEADS.

Specification forming part of Letters Patent No. 166,850, dated August 17, 1875; application filed January 14, 1875.

*To all whom it may concern:*

Figure 1:
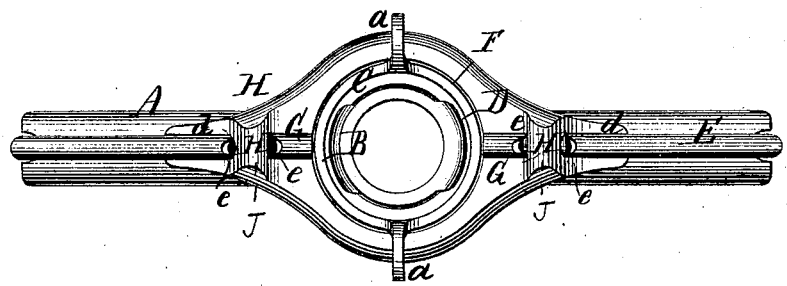
Figure 2:
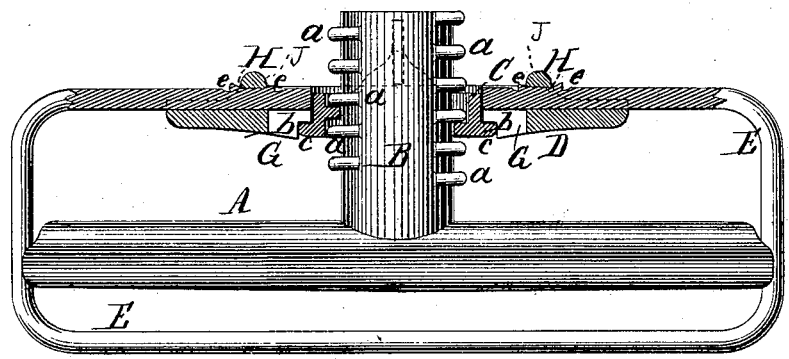
Figure 3:
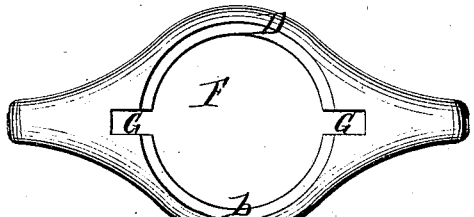
Figure 4:
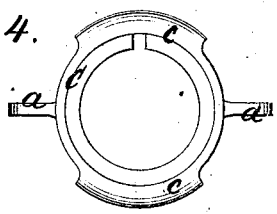

Be it known that I, JOHN K. CLARK, of Buffalo, in the county of Erie and State of New York, have invented a certain new and useful Improvement in Mop-Heads, of which the following is a specification:

This invention is illustrated in the accompanying drawing, in which Figure 1 represents a plan view of my improvement looking from below. Fig. 2 is a longitudinal sectional view of Fig. 1. Fig. 3 is a plan of the collar detached. Fig. 4 is a similar view of the nut.

Similar letters indicate corresponding parts.

This invention relates to the class of mop-heads constructed of a fixed and loose jaw, the latter moving toward or from the fixed jaw through the medium of a thumb-nut working in a collar placed on the shank of the loose jaw.

My invention consists in a peculiar construction of the collar, whereby the thumb-nut is easily inserted in its place in the collar, and is retained there by the binding-wire of the loose jaw. The collar consists of a ring having two arms extending from it on opposite sides to receive the ends of the binding-wire. The interior of the collar is of the same diameter, excepting near its upper edge, where it is made of a larger diameter, so as to form a ledge, on which the outside flanges of the nut can ride. The nut is provided with thumb-pieces opposite to each other on the outside of the nut near its lower edge, which serve to rotate the nut and also aid in securing the nut in the collar by means of the ends of the binding-wire. The collar is provided with slots, which are made of such a size and arranged in such positions as to permit the thumb-pieces to pass through them, thereby enabling me to place the nut in the collar without difficulty. When the thumb-pieces are passed through the slots the flanges of the nut rest on the ledge of the collar, and the thumb-pieces fall just below the plain under surface of the collar, over which surface they freely pass when the nut is turned. The slots in the collar are arranged in line with the arms of the collar that receive the ends of the binding-wire, and the arms are provided with sockets for receiving the ends of the wire, which sockets extend from the ends of the arms inward until they enter the slots, of which they form a continuation. The sockets are covered over for part of their extent by bridge-pieces, under which the wires pass, and by which they are held down, so as not to interfere with the thumb-pieces of the nut. When the nut is in the collar the ends of the binding-wire are inserted in the sockets and made to extend beneath the bridge-pieces into the slots, and close them against the thumb-pieces, which are consequently prevented from returning through the slots. After the ends of the wire are in place I nick the wire on each side of the bridge-pieces, so as to raise projections which will resist the movement of the wire in either direction.

In the drawing, the letters A B designate the cross-head and threaded shank composing the fixed jaw of my mop-head. The shank B is provided with a cavity to receive the end of a suitable handle, and with segments or teeth $a$, to which is fitted the thread of the nut C. This nut C works in a collar, D, that, together with a wire, E, constitutes the loose jaw of the mop-head. The nut C is provided with thumb-pieces $b\ b$, by which it may be turned in one or the other direction, and when so turned it, together with the loose jaw D E, moves toward or from the fixed jaw A B, in order to clamp or release the mop-rag. F designates the opening of the collar that receives the nut C, and from this opening extend slots G G, through which the thumb-pieces $b\ b$ of the nut are passed in adjusting the nut in place, and which slots have their continuations in sockets H H formed in the ends I I of the collar. At the upper edge of the opening F is formed a shoulder, $c$, while on the nut C are formed flanges $d\ d$, that rest against the shoulder.

When the nut is adjusted in the opening F of the collar the shoulder and flanges $c\ d$ serve to hold it to the collar on one side, while on the other side it is held by the thumb-pieces $b$, which ride over the plain under surface of the collar, as shown in Fig. 1. When the nut C has been placed in position in the collar the ends of the wire E of the loose jaw are inserted in the sockets H H and slots G G, as shown in Figs. 1 and 2, and by this arrangement the thumb-pieces $b\ b$ can pass and repass over the slots without danger of falling through. Over the sockets H H, and at any point between the ends of the arms and the slots G G, are formed bridge-pieces J J, under which the ends of the wire are passed in entering the slots, and which serve to hold the wire down.

When the binding-wire is strained on the cross-head A the pressure of the wire in the ends of the collar partakes of a prying or lever movement, which tends to hold the ends of the wire more securely in place, and thus the bridge-pieces serve to prevent the wire from springing out of place when that part of the wire constituting the loose jaw proper is strained on the cross-head A or on the mop-rag.

When the wire E has been adjusted in place it is nicked on the sides of the bridge-pieces J J, so as to form projections or stops $ff$, which effectually prevent endwise movement of the wire. If desired, however, the wire may be secured in any other manner without departing from my invention.

What I claim as new, and desire to secure by Letters Patent, is—

1. The nut C and the collar D, constructed with the slots G, in combination with the binding-wire E, having its ends arranged to close the slots G when the nut has been placed in the collar, and thereby secure the nut in place by the ends of the said binding-wire, substantially as described.

2. The combination of the collar D, constructed with the circular seat $b$, sockets H, and recesses G, extending laterally from the central opening F, the nut C having the flanges $c$ and thumb-pieces $a$, and the wire E having its ends passed through the sockets H, substantially as described, and for the purpose set forth.

3. The collar D, constructed with the sockets H and bridges J, in combination with the nut C and binding-wire E, having its ends inserted beneath said bridges, and thereby securing the wires in place, substantially as set forth.

In testimony that I claim the foregoing I have hereunto set my hand and seal this 8th day of January, 1875.

JOHN K. CLARK. [L. S.]

Witnesses:
  EDWIN L. FERGUSON,
  DANIEL F. KEMP.